United States Patent [19]
Bowlin et al.

[11] Patent Number: 4,879,659
[45] Date of Patent: Nov. 7, 1989

[54] LOG PROCESSING SYSTEMS

[76] Inventors: William P. Bowlin, Rte. 10, Box 206, Shreveport, La. 71129; Michael P. Knerr, 499 S. 9th, Ridgefield, Wash. 98642; Jeffrey D. Ballance, 4723 Bramblewood, Albany, Oreg. 97321

[21] Appl. No.: 125,019

[22] Filed: Nov. 24, 1987

[51] Int. Cl.$^4$ .............................................. B02C 25/00
[52] U.S. Cl. ................................. 364/468; 144/357; 364/474.09
[58] Field of Search ..................... 364/468, 469, 474; 83/71, 368; 144/312, 379, 357

[56] References Cited

U.S. PATENT DOCUMENTS

| | | | |
|---|---|---|---|
| 4,330,019 | 5/1982 | Murphy | 83/368 |
| 4,379,476 | 4/1983 | Berry | 364/468 |
| 4,379,477 | 4/1983 | Shrum | 364/468 |
| 4,404,640 | 9/1983 | Dumbeck | 364/468 |
| 4,640,160 | 2/1987 | Hards | 83/71 |

Primary Examiner—Michael R. Fleming
Attorney, Agent, or Firm—Robert L. Harrington

[57] ABSTRACT

A system for processing a log or cant including chippers, profiling heads, and saws arranged as a sequence of coupled operations. Scanners and computers determine the log configuration and projected configuration of lumber pieces to be derived. One scanning function is the determination of the wane area configuration in the region of the projected side board edges. This enables a determination of the side board edges including acceptacle wane area and the desired orientation (incline or decline) of the boards relative to the path of conveyance. The profiling heads are adjustable in response to computer calculations to edge the established side boards. Stabilizing is provided and includes guide anvils positioned at the board edges following the edging operation.

13 Claims, 12 Drawing Sheets

LOG PROCESSING SYSTEMS

FIELD OF INVENTION

This invention relates to log processing systems wherein a series of apparatus are coupled to perform a series of functions in sequence for converting logs to lumber.

BACKGROUND OF THE INVENTION

A log is the partial trunk of a tree whose configuration has developed over years of growth, influenced by a number of factors, such as terrain, environment, and weather. Each log is different and is more or less tapered from one end to the other. The cross section varies from generally circular to generally elliptical. It is often bowed and even more often blemished with a variety of defects including concavaties, splits, and the like. Lumber is produced from these irregular log configurations which lumber consists of regularly shaped boards of specified length, width, and thickness. determining the optimum lumber production from each irregularly shaped log is important and is what this invention is about.

Logs are processed by the thousands over a period of a single one-day shift of lumber production. Correct alignment and positioning will enable increased utilization of the log. Such increased utilization may be the result of more lumber pieces produced or a better mix of lumber pieces which, in either case, produces higher value of lumber produced from a single log. Because such increased log utilization is multiplied by the thousands of logs processed in a single shift, the attainment of the correct alignment and positioning of logs is of great importance. Consequently, log analyzing, log handling, and log cutting apparatus have been developed to a high degree of sophistication.

In a typical log breakdown system, a log is first scanned and computer analyzed to determine the optimum configuration of lumber pieces that will fit the log configuration. The log is then preliminarily shaped to remove the wood material on the rounded sides that does not fit into a board (referred to herein as excess material). For example, the log will be passed through chippers that remove this material and produce flat surfaces on the two opposed sides of the log. Slabs or flitches are then cut from the two sides. (As used herein the terms slabs and flitches are interchangeably used to refer to the initial board width cut from each side of a log or cant.)

The remaining center section having flat sides and rounded top and bottom is referred to as a center cant and is intentionally sized to produce a precise number of specific lumber pieces. In a subsequent operation, the cant is rolled 90 degrees, and the newly provided curved or rounded sides (previously the top and bottom) are chipped as before to remove the excess material and produce opposed flat sides. It is then passed through a saw array and sawn; e.g. into one-by-fours and two-by-fours. (The logs processed in the initial breakdown, and the center cants processed in a secondary breakdown are collectively referred to herein as log segments.)

In the processes just described, the side slabs or flitches from the full log have wane edges. Wane is that area that ends up on a section sawed from a log that was a portion of the outer surface of the log. The flitches being a full width section sawn from the log includes the irregularly curved section of the log's periphery along each side edge and thus each side edge of the flitch is wane area. Lumber specifications (wane rules) allow only a specified amount of wane area to be left on the board and still be acceptable in grade. It is highly desirable to be able to precisely comply with the wane rules leaving neither too much nor too little of the wane area for that lumber grade. The side flitches are typically directed to an edger which precisely cuts the straight edges desired for a finished board and in the process cuts off the unacceptable wane area from the wane edges.

A similar process is required for at least the outer boards sawn from the center cant. Even though four flat sides are provided on the center cant following the chipping operation, the corners have wane and thus wane areas appear on the outside corners of the outside boards cut from the cant. These wane areas must be edged in the same manner as described above.

The handling apparatus and the controls for setting the saws, chippers, and edgers must be precise. Furthermore, they must be rapidly adjustable from log to log to accommodate the differences in log sizes and configurations.

PRIOR ART

It was recognized heretofore that coupling the various functions (chipping, sawing, and edging) is desirable to obviate the need for duplicating the scanning, positioning, and handling apparatus. An advance toward this end is the edger/profiling heads such as disclosed in U.S. Pat. No. 4,015,648 issued to Shephard on Apr. 5, 1977, and U.S. Pat. No. 4,335,767 issued to Reuter on June 22, 1982.

This coupling of operations; i.e. chipping, profiling, and sawing, has achieved the desired advantages of eliminating the apparatus and controls for a separate edging operation, but it has done so at a compromise in log utilization.

A major problem of the coupled operations of the prior art has been the inability to rapidly adjust the profiling heads. Scanning technology has been well developed to determine chipping head and saw array setting for optimum saw cuts through the log. However, the edging/profiling operation as proposed just prior to cutting, requires determining the desired depth including a determination of how far down on a board-to-be-cut does the wane area extend?

A second problem is log handling. Handling apparatus can be adapted to individual processing functions but coupling these functions creates handling problems, or more accurately, the need for specialized control capabilities to insure that the log segment (log or center cant) is stabilized throughout the multiple operations.

Previously these problems have been dealt with by separating the log supply into size categories, manually setting the apparatus to cut a particular configuration of lumber pieces from all of the logs of a related category, and manually presetting all of the apparatus to accommodate that size log. When one category of log sizes is depleted, a second category is selected and the apparatus is manually set for the new size.

SUMMARY OF THE INVENTION

It is an object of the present invention to provide log scanning and log handling apparatus that enables the coupling of chipping, profiling, and sawing operations, but with rapid and automatic adjustment capabilities that enables random size logs to be fed through the system while achieving, for each log, a customized cutting configuration optimizing the lumber pieces produced therefrom.

In a preferred solution, different handling apparatus are proposed for full logs as differentiated from center cants. A center cant, by definition has two parallel flat sides before it enters the system and is intentionally configured to be cut into lumber pieces extended through the flat sides; i.e. with the flat sides oriented as the top and bottom sides as the cant is fed through the vertically oriented saw blades. For these center cants the handling apparatus preferably utilizes a conveying system including pressure rollers that both drive and securely clamp the cant between the top and bottom flat sides. The pressure rollers are designed to maintain a precise feed position of the center cant through the various operations.

The handling apparatus of a full log is preferably a sharp chain wherein the log is impaled on the spikes of a conveyor chain. As the log emerges from the chipping heads (where two parallel flat sides are produced) stabilizing rollers engage the sides and secure the log for precise feeding of the log.

In order for the above systems to be complete, the profiling heads of the invention must be adaptable to the varying log segment configurations. Whereas the positioning mechanism has previously been available, the ability to quickly determine where to position the heads has not. The present invention provides that capability by the positioning of occlusion and reflective beam scanners and by a modeling technique whereby the wane surface configurations are computed from selected scan data. In essence, the scanners measure multiple surface positions on the log segment circumference at numerous cross sections along the log segment length. The log's curvature is estimated from this information. The wane area configuration is then calculated, and from that configuration, the wane area that must be removed. The board to be cut is then determined in both size and orientation which thus determines the edge of the board and thus the setting of the profiling heads. Whereas the board is likely angularly oriented relative to the log segment and the path of travel, the computer controlled heads are maneuvered during the operation to form a board that is inclined to the path of travel. Also provided immediately behind the profiling heads are adjustable guide anvils that slide in the groove formed by the profiling heads. They are preset by the computer to match the incline. These guide anvils assist in stabilizing the log segments.

The invention and its advantages will be more clearly understood by reference to the following detailed description. This description is supplemented by drawings briefly described below.

BRIEF DESCRIPTION OF THE DRAWINGS

FIGS. 1A–4B are schematic views illustrating the operations being performed on a log as a coupled sequence of operations in accordance with this invention;

FIGS. 5A–8B are schematic views illustrating the various operations being performed on a center cant as a coupled sequence of operations in accordance with the invention;

The following detailed description is organized so as to explain first the processing of logs, with reference to FIGS. 1A–4B, 9A, 9B and 11. Then the corresponding processing operation of cants will be explained, referring to FIGS. 5A–8B, 10A, 10B, 10C and 12. The apparatus for each of these processes will then be generally explained with reference to FIGS. 13 and 14. Then the apparatus for log processing will be more specifically explained, referring to FIGS. 15-17, and finally the apparatus for cant processing will be specifically explained, referring to FIGS. 18–21. Each of these sections is identified by subheadings.

LOG PROCESSING

Figure 11:
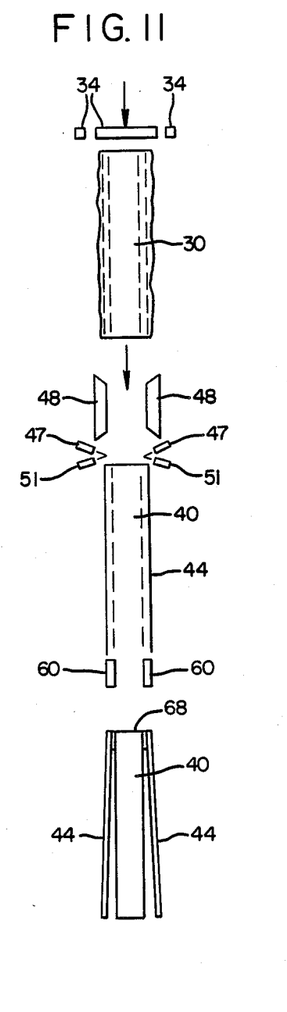
FIG. 11 is a schematic illustration of the coupled operations of chipping, profiling, and sawing a log.

Reference is made to FIGS. 1-4 (A and B) and FIG. 11. The processing of a log 30 involves a first step of aligning the log with the desired direction of travel and impaling it onto the spikes 38 of a sharp chain 36 as indicated in FIGS. 1A and 1B. Occlusion type scanners 34 then scan the log in both the vertical and horizontal axis to determine the log configuration in two planes from which a computer determines the optimum cutting configuration; i.e. where the center cant 40 and flitches 44 are positioned in the log (FIG. 1A). This determines the positions of cutting lines 42 and flat surfaces 46.

Figure 2A:
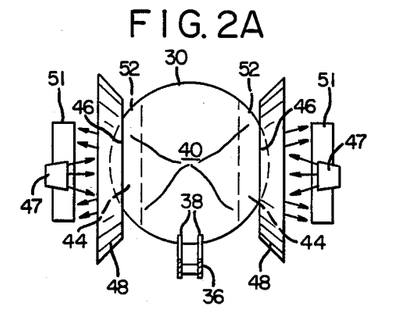
FIG. 2A is a cross sectional view illustrating the chipping operation for removing excess material outside the flitches, and subsequent scanning for determining the board edges.
Figure 2B:
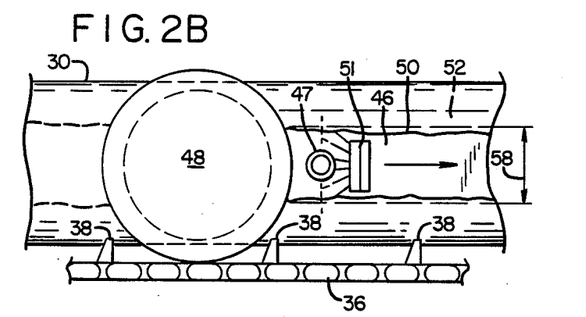
FIG. 2B is a side view of FIG. 2A.

The log is then passed through chippers 48 which are set by the computer to remove the excess material outside the face 46. Referring to FIG. 2B it will be noted that edges 50 of face 46 is irregular along its length. The configuration of the wane area adjacent edge line 50 just outside the surface 46 (area 52) is important to know for maximizing the desired board that can be produced from each of the flitches 44.

To determine the configuration of edge lines 50 and adjacent wane area 52, a reflective beam or camera type scanning mechanism consisting of a laser beam projector 47 and a camera 51 is positioned immediately following the chipping operation. (As will be subsequently explained, it is desirable in the preferred embodiment to mount the scanning cameras to the chipping head frame so that the cameras will maintain a specific spacing from the surfaces 46 of the log.)

Figure 1A:
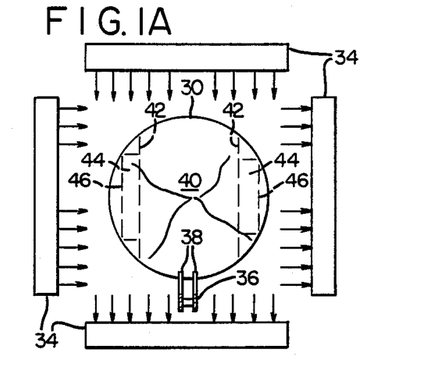
FIG. 1A is a cross sectional view of a log conveyed by a sharp chain and being initially scanned to determine the log's configuration and the side flitches to be sawn therefrom.
Figure 1B:
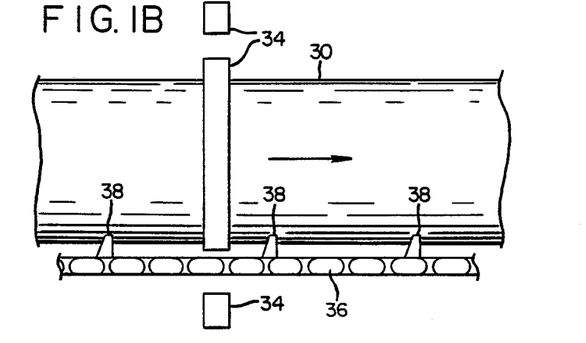
FIG. 1B is a side view of FIG. 1A.

As previously explained and as illustrated in FIGS. 1A and 11, the log is first scanned (by occlusion scanners 34) in the vertical and horizontal directions prior to chipping. At numerous cross sections along the log length, e.g. every 3 inches, readings from these scanners identify four tangents. The log is assumed to be elliptical at each cross section as determined by these tangents and the combined ellipses make up a model assumed by the computer to be the log's configuration. Thus every segment of the log's surface is assumed to have a particular convexly curved shape known to the computer.

As of the point in the system wherein camera scanning (scanners 47, 51) takes place, the computer has already determined from the occlusion scanning operation a proposed configuration of boards to be sawn from the entire log. This determination is subject to some modification as a result of subsequent scanning operations. However, from this initial occlusion scanning operation, the size and location of the center cant 40, the size and location of the boards to be cut from the center cant, the size and location of the side flitches 44 and the location of the chipping surface 46 are all determined by a computational process known as "Real Shape" TM developed and marketed by the Applied Theory division of U.S. Natural Resources, Inc., located in Corvallis, Oregon.

Figure 9A:
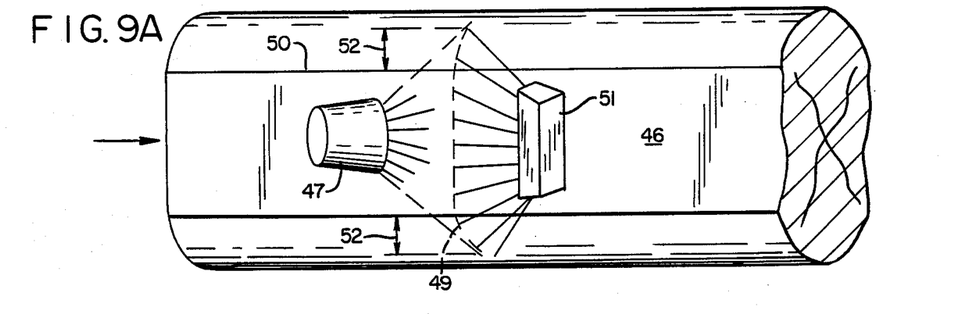
FIGS. 9A and 9B further illustrate the scanning technique for scanning the log following removal of excess material, generally indicated in FIGS. 2A and 2B.
Figures 9B, 10A:
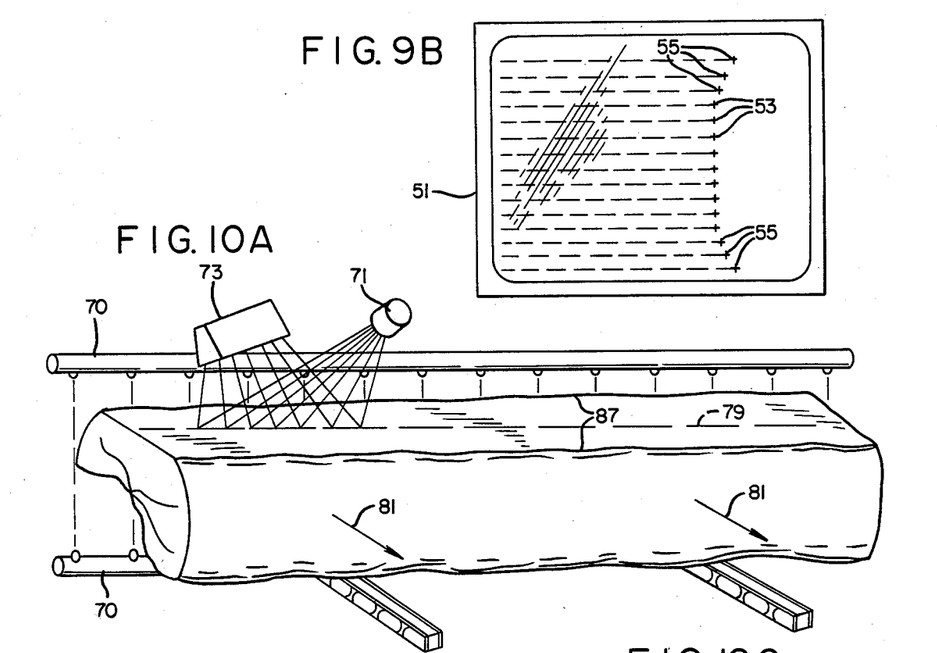
FIGS. 10A, 10B and 10C illustrate the scanning technique for scanning the cant, as generally indicated in FIGS. 5A and 5B.

The first operation, chipping the excess material down to faces 46, is controlled by the computer and based on the "Real Shape" TM computation. This operation is illustrated in FIGS. 2A and 2B. As the open faced log emerges from the chipping heads, the log is again scanned for the purpose of setting the profiling heads 60 of FIGS. 3A and 3B. FIGS. 9A and 9B illustrate the concept of the camera scanning that takes place following chipping.

From FIG. 9A, the laser beam projector 47 projects a vertical laser beam line 49 down the side of the log (across the open face 46 and extended some distance above and below edge line 50, e.g. one inch). A camera 51 (specifically, a modified closed circuit television camera) focused on the area of projection but offset therefrom at a predetermined angle "sees" the line (a lens on the camera receives and transmits the reflected light of the laser line) which is projected onto a screen represented in FIG. 9B. The camera scans the screen at 0.1 inch intervals and establishes points on the screen that represent, by their location on the screen, the distance to corresponding points on the projected laser line. As indicated in FIG. 9B the points 53 through the center of the screen are aligned top to bottom representing the laser line segments on the flat surface 46. The points 55 that fall away from the aligned points 53 at the extreme top and bottom of the screen represent the configuration of wane area 52. It will be recognized that this concept is based on the triangulation method of measuring distances, i.e. the view of line 49 at an angle allows the camera to observe the falling off of the line 49 at the wane area.

The camera scanning technique described, obtains the approximate surface configuration of the area abounding the edge wane 52. The knowledge of this small area of wane, for which the described camera scanning is reliable, is important for the computer to determine the setting of profiling heads 60. Readings are taken, e.g. every 3 inches along the log length and the accumulation of the readings enable the computer to determine the desired board edges 58 indicated in FIG. 2B.

Dimensional lumber wane edge rules enables a determination (by the system's computer) of the largest or most valuable dimensional lumber piece (edge lines 58) that will fit each of the flitches 44. This calculated lumber piece will likely be inclined in an upward or downward direction relative to the log length, primarily due to the tapered shape of a typical log.

Figure 3A:
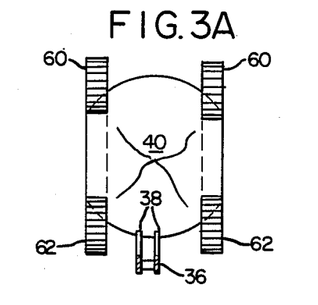
FIG. 3A is a cross sectional view illustrating the operation of edging a to-be-sawn board.
Figure 3B:
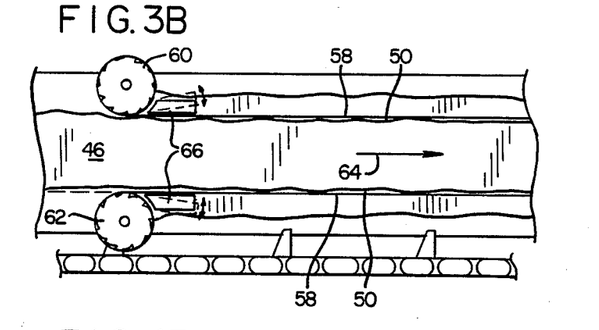
FIG. 3B is a side view of FIG. 3A.
Figure 4A:
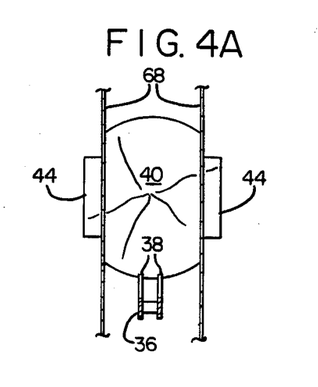
FIG. 4A is a cross sectional view illustrating the operation of sawing the side boards from the log and producing thereby a remaining center cant.
Figure 4B:
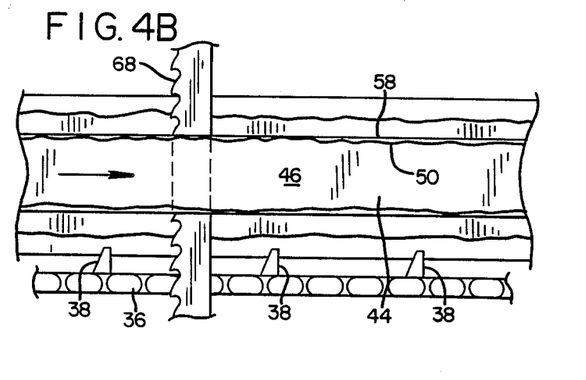
FIG. 4B is a side view of FIG. 4A.
Figure 5A:
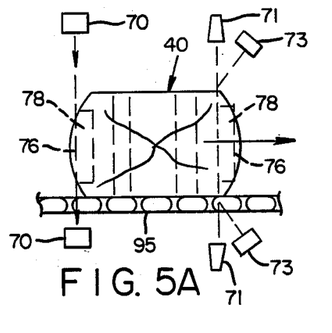
FIG. 5A illustrates a center cant in cross section being scanned to confirm or determine the desired saw cuts and the desired edging of the outer boards.
Figure 5B:
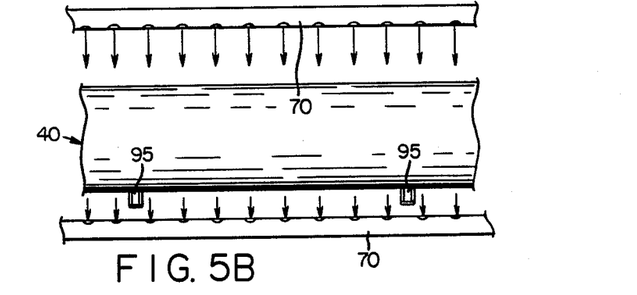
FIG. 5B is a side view of FIG. 5A.

FIG. 3A illustrates the edging operation for edging the calculated lumber piece (edges 58). Profiling heads 60 and 62 perform this edging operation. The lumber piece has a consistent width and thickness throughout its length. Profiling heads 60, 62 are thus spaced apart the width of the lumber piece (edges 58) and at the same inward position (the board thickness). In order to follow the incline or decline of the board edges 58, both heads 60, 62 must similarly be lowered or raised as the log is passed through the heads as indicated by arrow 64. The rate of movement of the log is carefully controlled and the raising or lowering of heads 60, 62 are matched to that rate of movement to generate the precise calculated straight side edges 58. The cutting action of the profiling heads is computer controlled. The computer also calculates the required slope angle for anvils 66 and initiates the appropriate precise angular setting of the anvils to be further explained in a later section.

Following the edging or profiling operation, the logs are guided through saw blades 68 (FIGS. 4A and 4B) which are aligned to precisely cut the board 58 to the proper thickness, leaving center cant 40.

Whereas the above described scanning operation and computing technique is known to identify the configuration of the abounding wane area 52, a system also contemplated will identify the configuration of wane area 52 prior to chipping. This would be accomplished by positioning camera scanners (like 47,51) ahead of the chipping heads 48, e.g. adjacent the occlusion scanners. The general location of wane area 52 is known so that the camera scanning components 47,51 would be generally positioned for obtaining reliable scan data throughout the general vicinity of the to-be-determined wane area 52. This data, coupled with that of the occlusion scanner, should permit the computation of the desired edge lines 58. This will determine the appropriate setting of the profiling heads while reducing the spacing required between the chipping head (or more accurately, the scanners mounted on the chipping head frame) and the profiling heads.

CANT PROCESSING

Figure 12:
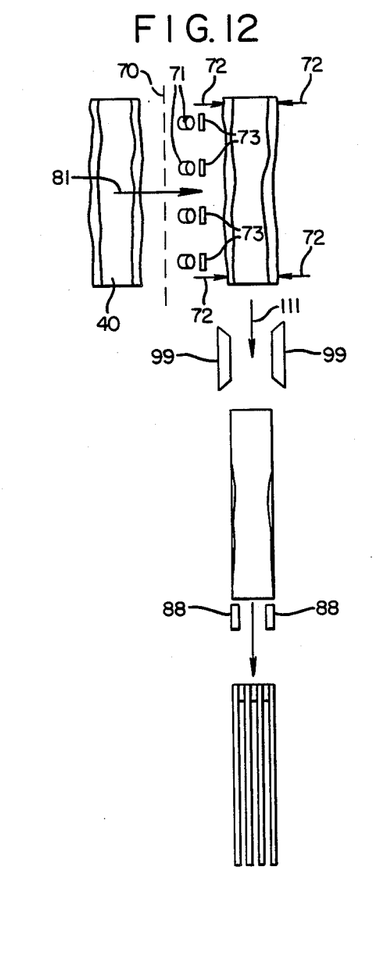
FIG. 12 is a schematic illustration of the coupled operations of chipping, profiling, and sawing a cant.

Reference is now made to FIGS. 5-8 (A and B), 10 (A, B and C) and FIG. 12. The cant 40 has two flat parallel sides and can be effectively skew positioned from scan data. From FIG. 12, the cant 40 is scanned by scanning mechanism 70 (occlusion scanners), and scanning mechanism 71 and 73 (camera scanners) as the cant is conveyed laterally (arrow 81) on chain conveyor 95 (shown in FIG. 5A). The cant is repositioned for optimum cutting as indicated by arrows 72 (FIG. 12) in a manner known to the industry. The opposed flat parallel surfaces (e.g. as a result of sawing flitches 44 in FIG. 4A) are positioned top and bottom as a result of rolling the cant 90 degrees from the position indicated in FIG. 4A, and clamping and driving rollers 74, 82 (FIG. 6A) clamp onto and securely maintain the position of the cant during conveyance of the cant through the system.

Figure 10B:
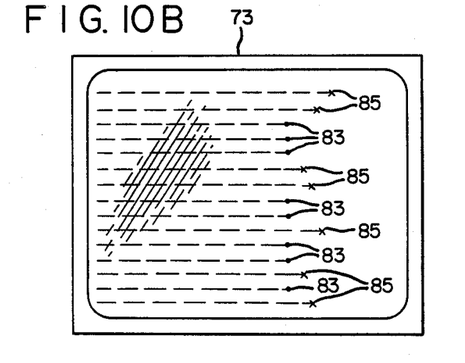

The occlusion scanners 70 and camera scanners 71, 73 determine the location of the boards 78 at each side of the cant (see FIGS. 5A-8A) which will be explained with particular reference to FIG. 10 (A, B and C).

Figure 10C:
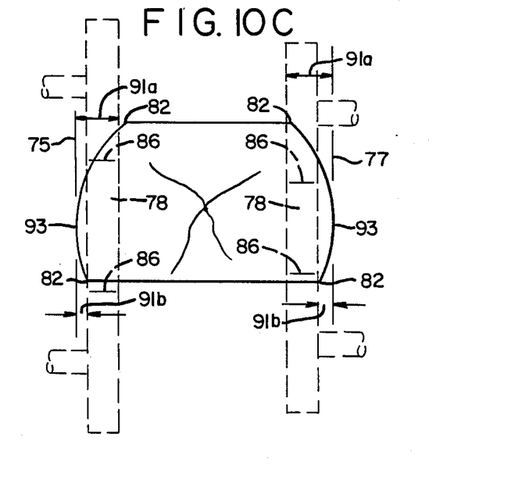

The occlusion scanners 70 precisely identify the leading and trailing edges of the cant which thus determines the tangents 75, 77 at numerous cross section, one of which cross section is illustrated in FIG. 10C. The camera scanner includes a laser beam source 71 that projects a line 79 along the cant length at both the top and bottom of the cant (only the camera scanning at the top of the cant is illustrated in FIG. 10A, however). This laser projected line sweeps laterally across the cant as the cant is moved past the scanning mechanism as indicated by arrow 81 (see also FIG. 12).

Several laser beam sources 71 and several cameras 73 are typically required to project and view a continuous line 79 along the length of the cant, at both the top and bottom of the cant. However, only a single projector and camera set up are illustrated and only on the top side of the cant in FIG. 10A. The camera 73 includes a screen (FIG. 10B) that views the laser projected line. A scanning function within the camera detects the location of the line image at spaced intervals (every three inches) along the length of the line. These locations are indicated in FIG. 10B as points 83 and 85. The aligned configuration of points 83 indicate a flat surface. Readings are taken at every 1/10 inch movement of the cant. Points 85 indicate readings as the laser projected line slides over the trailing edge of the front and trailing edges 87 and into the wane area following that trailing edge. At each of the three-inch intervals this transition of flat area to wane area is noted and determines the edge points 82 (FIG. 10C). At each cross section (i.e. every three inches where readings are taken) the configuration of the cant is calculated as follows:

With reference to FIG. 10C (a cross section at one of the three-inch intervals), it will be observed that the vertical or y positions of the top and bottom flat surfaces are known (from points 83 on the screen), both horizontal and vertical positions (x and y) are known for points 82, and the horizontal position (x) of tangents 75 and 77 are known. The computer can then calculate the distances 91a and 91b from points 82 to tangent 75 at one edge, and the distances 91a and 91b to tangent 77 at the other edge. The relationship of distances 91a to 91b is assumed to be proportional to the position of the point of tangency, point 93, as between the top flat side and bottom flat side. Thus if the ratio of 91a to 91b is 3 to 2, point 93 is 3/5 of the distance down from the top surface. For each side, two points 82 and one point 93 are known. A circle is fit to these three points and the segment of the circle that includes the three points is assumed to be the configuration of the cant.

The computer presumptively knows the two dimensional configuration of each cross section, and from an accumulation of all of the cross sections at the three-inch intervals, the computer presumptively knows the three dimensional configuration of the cant. With this information the computer is able to calculate the total desired configuration of boards to be cut from the cant which includes, as necessary, the angled orientation of edge lines 86 of boards 78 illustrated in FIGS. 6B, 7B and 8B. A consideration in determining this desired configuration is the allowable wane area permitted by the wane rules for the outer boards 78. All of the calculations are within the capability of computers and computer programmers once the information as described above is made available.

Figure 6A:
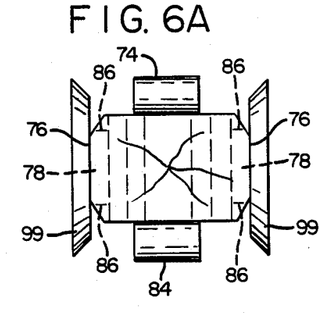
FIG. 6A illustrates the center cant in cross section being driven through chippers for removing excess material.
Figure 6B:
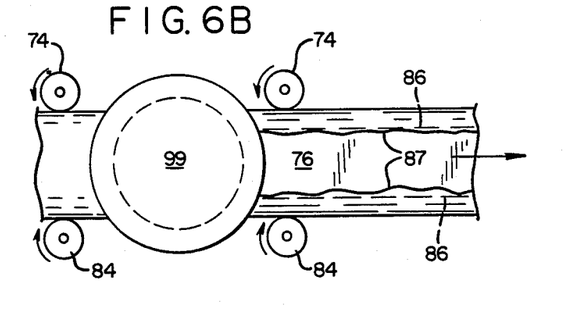
FIg. 6B is a side view of FIG. 6A.
Figure 7A:
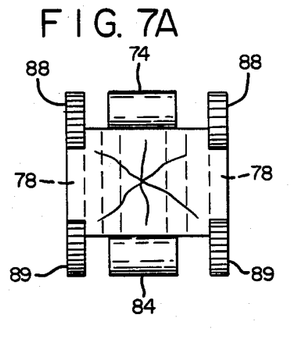
FIG. 7A illustrates the center cant in cross section being driven through profiling heads for edging the identified outer side boards.
Figure 7B:
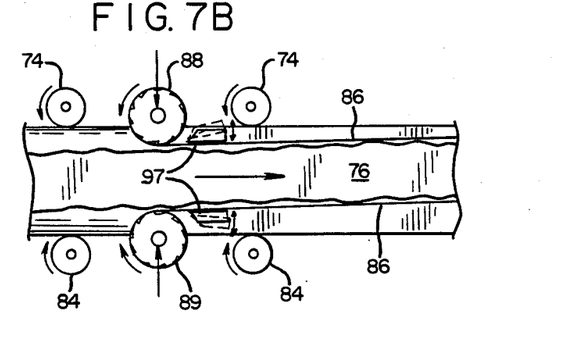
FIG. 7B is a side view of FIG. 7A.
Figure 8A:
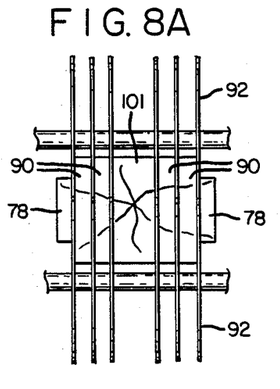
FIG. 8A illustrates the center cant in cross section being driven through a saw array for cutting the center cant into boards.
Figure 8B:
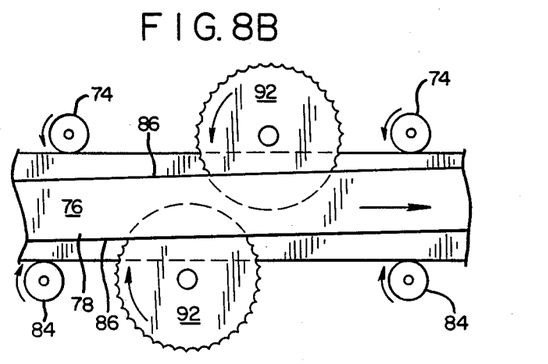
FIG. 8B is a side view of FIG. 8A.

The likelihood is that the edges 86, as viewed in dash lines in FIG. 6B, will be inclined relative to the direction of movement of the cant. The drive rollers 74,84 first drives the cant through the chipper 99 (FIG. 6A and 6B) to produce the flat parallel faces 76. The cant is then driven by rollers 74,84 (being passed from one set of rollers to another as will be explained later) through the profiling heads 88 as viewed in FIGS. 7A and 7B. Again the profiling heads at each side are set apart the distance of the board width. By calculating the rate of cant movement, each pair of top and bottom profiling heads are moved in concert up or down to achieve the edging of the determined side board 78. Of course the profiling heads on one side for board 78 are independent of the heads on the other side in that the orientation of the boards and their sizes are likely different and may even by inclined in different directions.

The drive rollers 74,84 continue to drive the cant 40 throughout the system. However, as will be noted in FIG. 7B, immediately following the profiling operations, anvils 97, which have been computer adjusted to the desired angular setting, are provided to precisely fit the notches or grooves formed by the profiling heads 88,89. These anvils further control movement of the cant through the system. The cant is cut into pieces 78, 90 and 101 by precisely set circular saw blades 92. Center piece 101 is wider than pieces 78 and 90 to illustrate the ability of the system to cut different sized boards, i.e. by setting blades 92 to produce a wide board or a timber, as may be called for by the computed configuration of cuts.

Figures 13, 14:
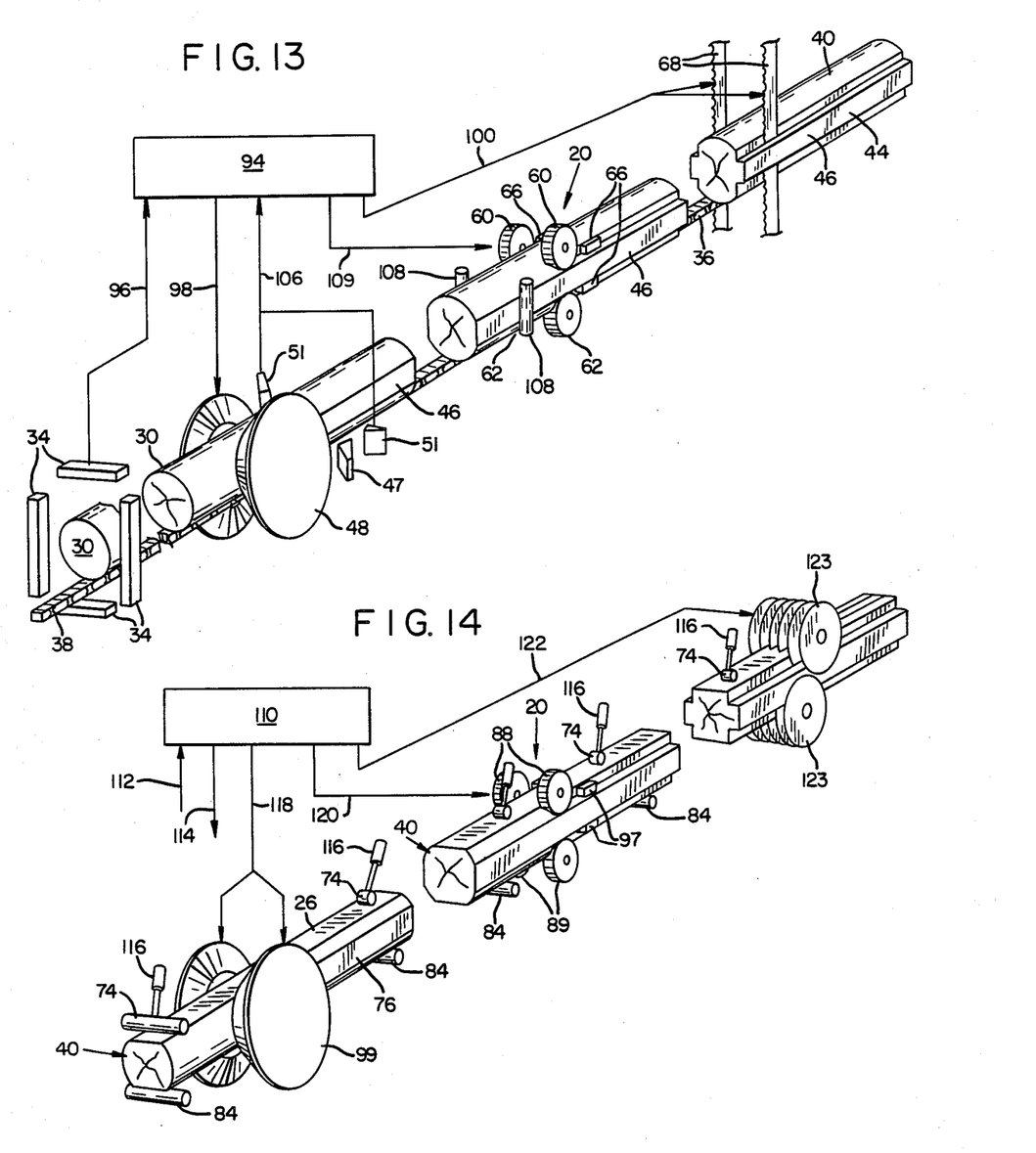
FIG. 13 is a perspective view of the sequence of apparatus used for processing a full log.
FIG. 14 is a perspective view of the sequence of apparatus used for processing a cant.

The apparatus for performing the operations of the above described coupled operations or functions are illustrated in perspective in FIG. 13 (for log processing) and FIG. 14 (for cant processing).

LOG PROCESSING APPARATUS IN GENERAL

Referring first to FIG. 13, a log 30 is shown impaled on a sharp chain 36. (The mechanism for mechanically centering the log on the sharp chain is not shown.) The dual axis occlusion scanner 34 first scans the log and feeds the scan data (arrow 96) to a computer 94. The computer determines the desired center cant and side board widths and directs the setting of chippers 48 (arrow 98), and also directs the setting of band saw blades 68 (arrow 100).

The sharp chain 36 moves the log through the chippers 48 to produce the desired surfaces 46. As the log emerges from the chippers, it is scanned by camera scanners 47, 51 (but note the last paragraph under "Log Processing") and the scan data is fed to the computer 94 (arrow 106). Guide rollers 108 stabilize the log as the log is directed into the profiling heads 60,62.

As explained in the preceding section, the setting for profiling heads 60, 62 and anvils 66 are established by the computer (arrow 109). The raising and lowering of the heads during the profiling operation is coordinated with the movement of the sharp chain to accomplish edging of the optimum board width. Because vertical as well as lateral stabilization is important during this edging operation, the guide anvils 66 are precisely set to ride in the just-formed edge and set at whatever angle the board is oriented in the log. (These guide anvils are explained in a later section.)

The saws for sawing off the side boards (band saws 68) have been previously set as indicated and the product of the system is a center cant 40 and pre-edged side boards 44.

CANT PROCESSING APPARATUS IN GENERAL

The processing apparatus for the center cant 40 is illustrated in FIG. 14. The center cant 40 is rolled onto one of the flat surfaces and scanned as it is moved laterally into alignment with the processing path (see arrow 111 in FIG. 12). The scan data is fed to a computer 110 (indicated by arrow 112). This scan data enables the computer to determine the optimum cutting configuration, indicated in FIG. 5A. The repositioning mechanism (not shown) is instructed by the computer for positioning the cant (indicated by arrow 114). Rollers 74 (through pressure cylinders 116) clamp the cant against rollers 84 in the repositioned position and feeds it through the system.

Instructions from the computer 110 to the chipping heads 99 (arrow 118) determine the excess portion to be removed and to thereby produce face 76. The cant, still clamped by the rollers 74, is directed through the profiling heads 88, 89 which have been also set by the computer 110 (arrow 120). (Anvils 97, also controlled by the computer, slide in the just formed edge and assist in stabilizing the cant.) The projected board is edged by the profiling heads and the cant is then sawn by saws 123 in accordance with the computer generated configuration (arrow 122).

PREFERRED LOG PROCESSING APPARATUS IN DETAIL

Figure 15:
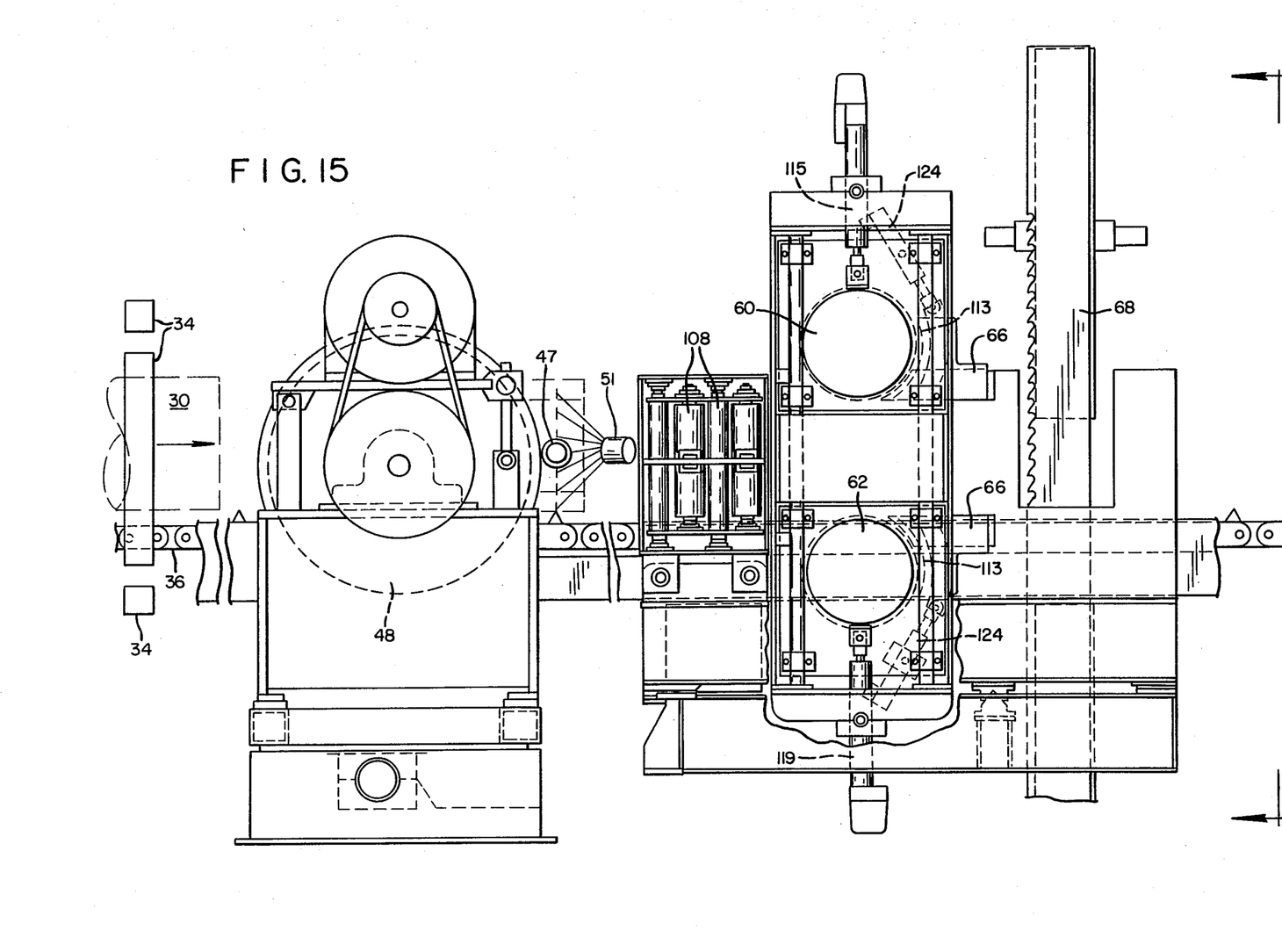
FIG. 15 is a side view of the apparatus used in the operation of FIG. 13.
Figure 16:
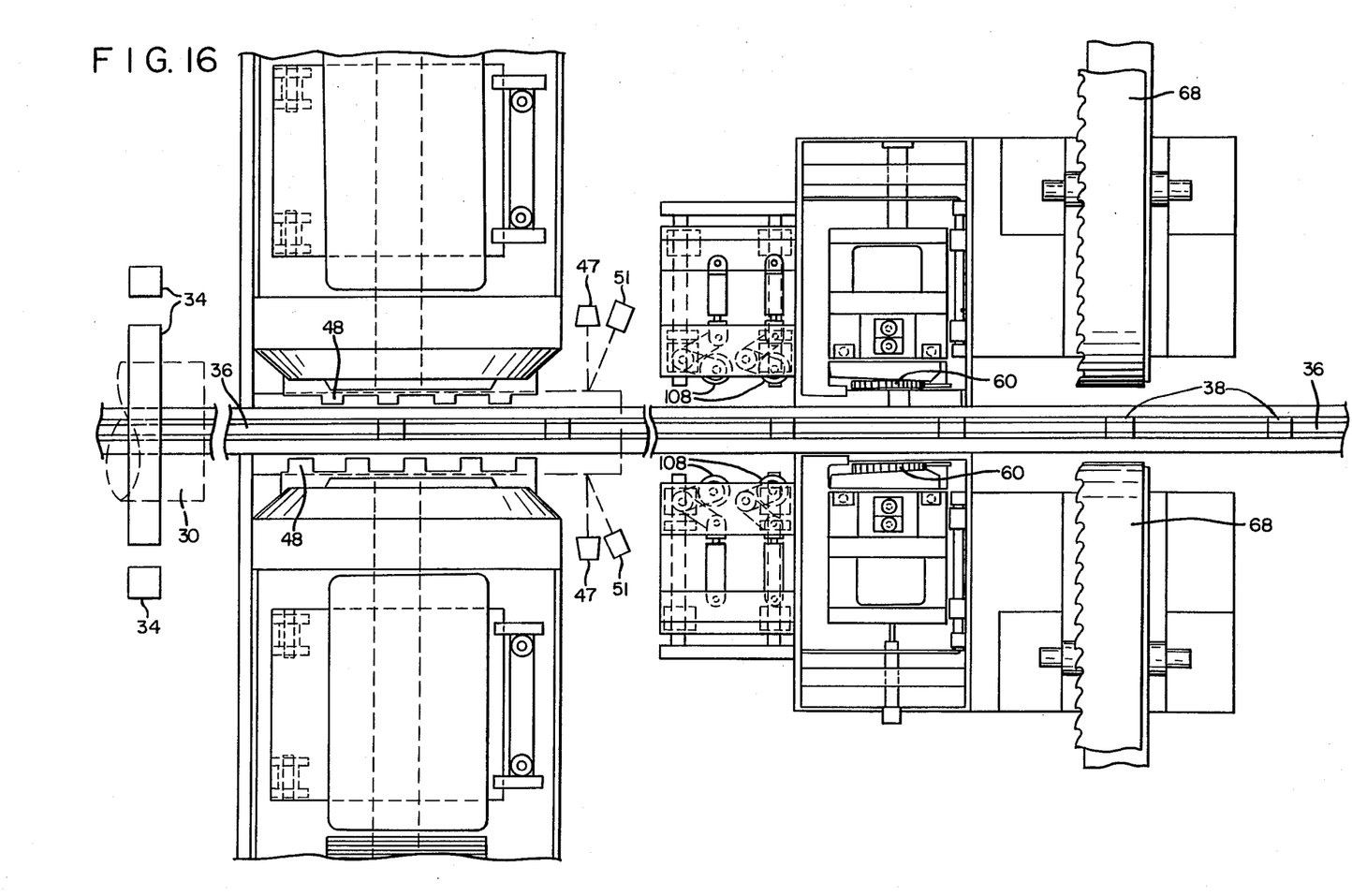
FIg. 16 is a top view of the apparatus of FIG. 15.
Figure 17:
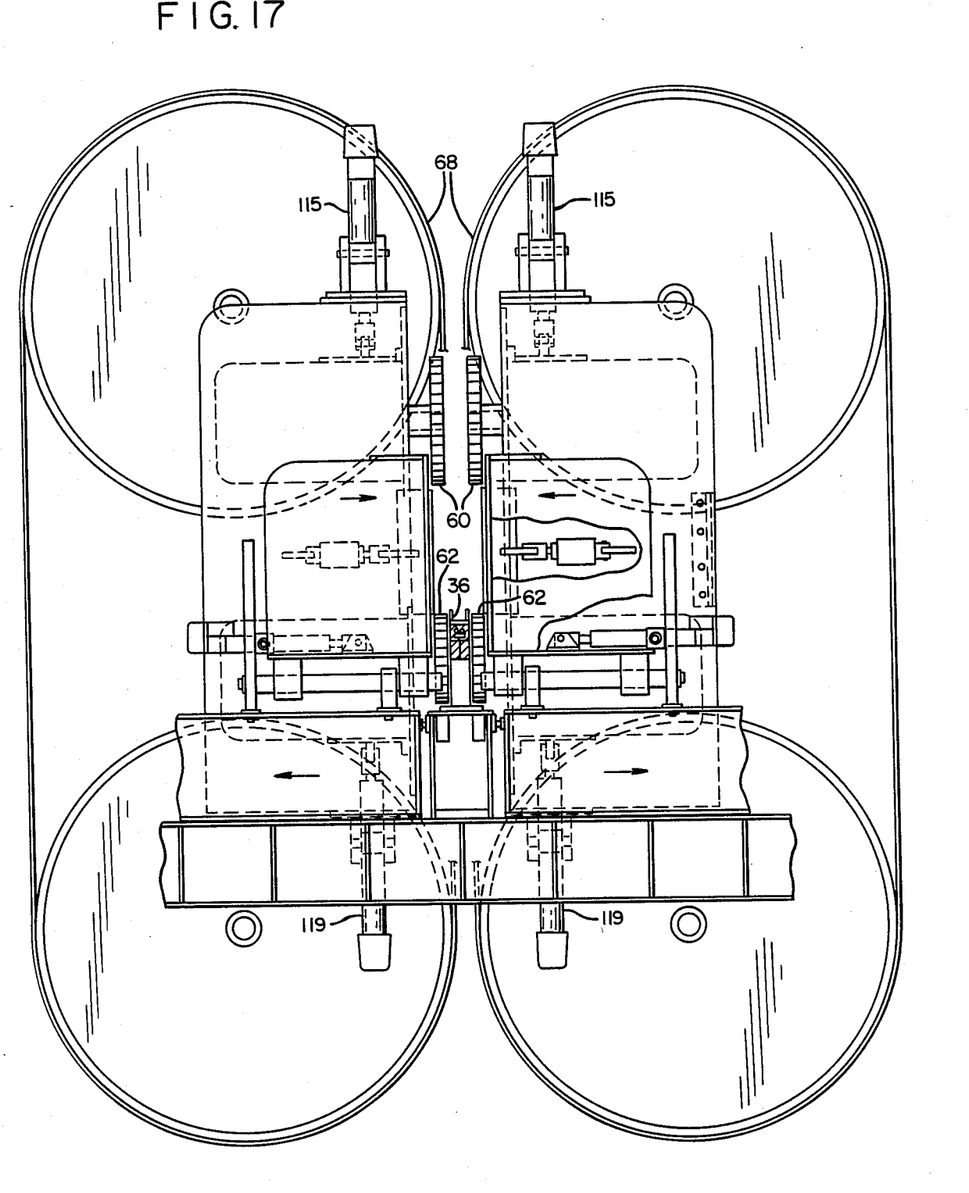
FIG. 17 is a view taken on view lines 17—17 of FIG. 15.
Figure 18:
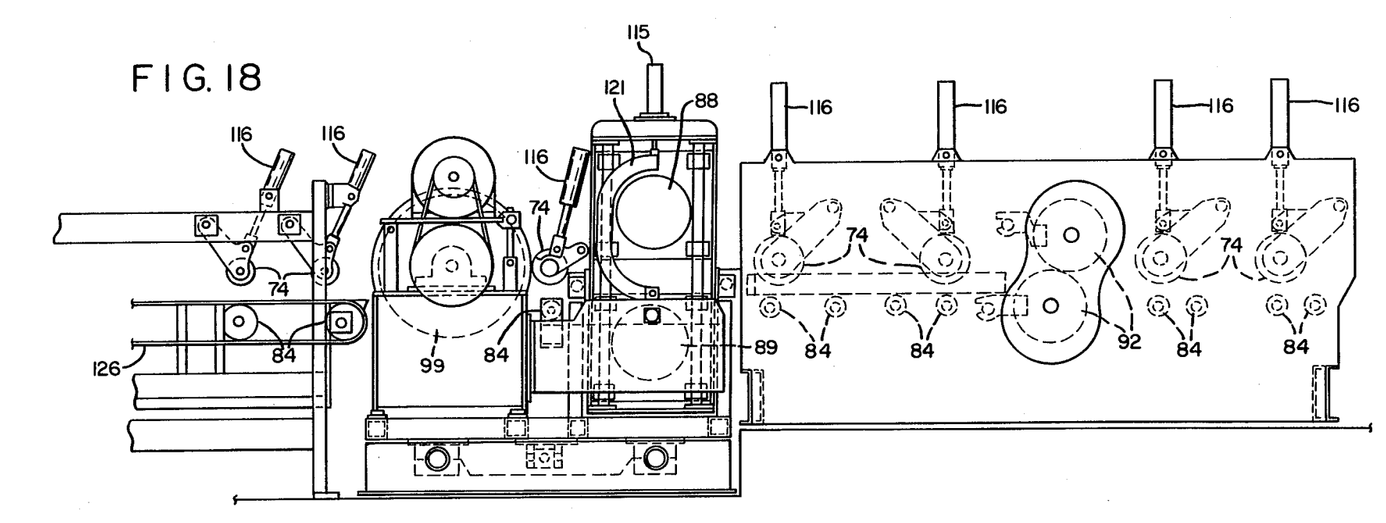
FIG. 18 is a side view of the apparatus utilized in the operations of FIG. 14.
Figure 19:
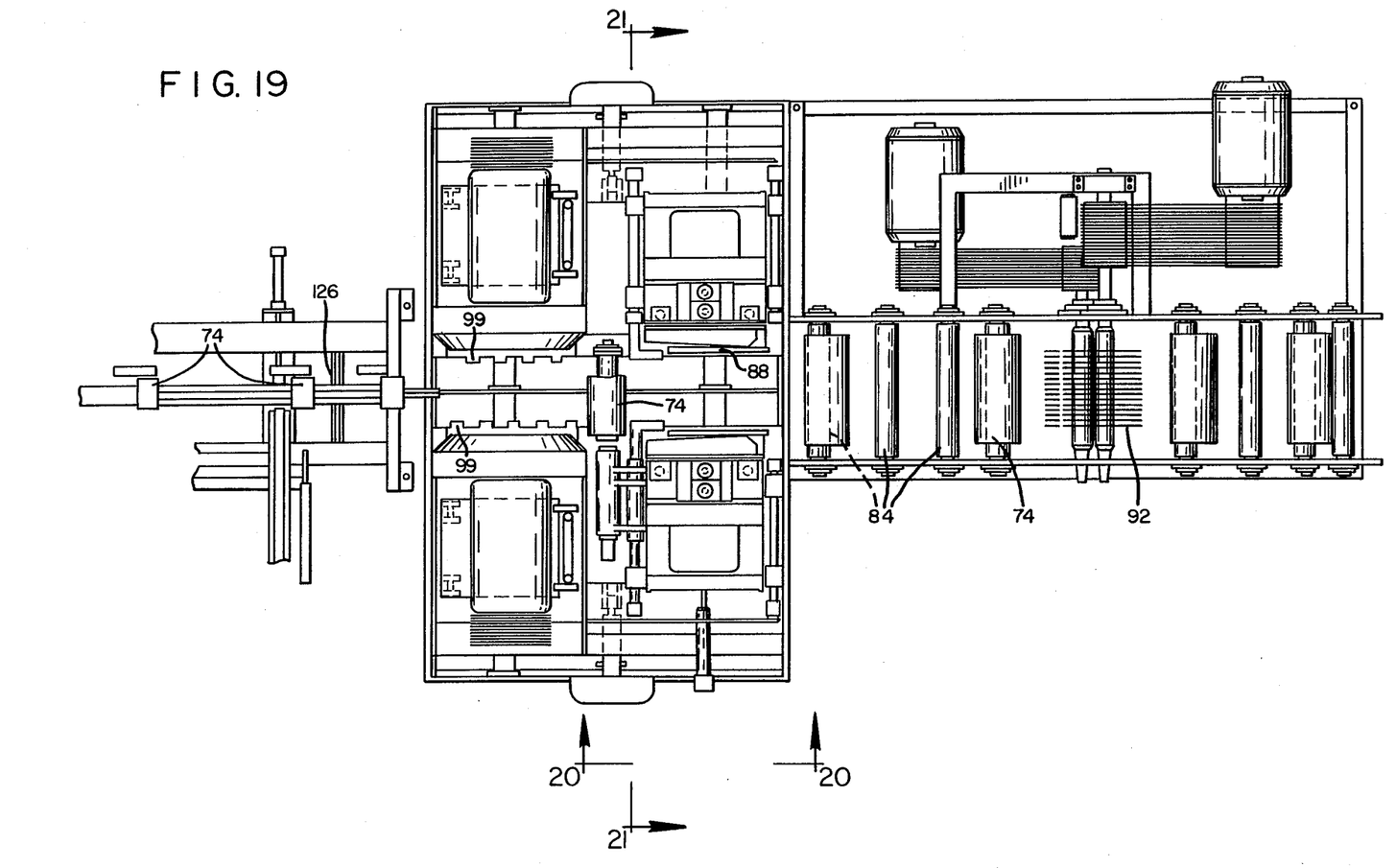
FIG. 19 is a top view of the apparatus of FIG. 18.

Reference is now made to FIGS. 15-17 showing the apparatus of FIG. 13 in more detail. FIG. 15 is a side view and FIG. 16 is a top view of the apparatus. FIG. 17 is a front view of the profiling heads, band saw and associated apparatus. As illustrated, a sharp chain 36 conveys logs 30 through the various operations in the system including a first or primary scanning operation (scanners 34), a chipping operation (chippers 48), a secondary scanning operation (projector 47 and camera 51), an edging operation (profiling heads 60,62) and a sawing operation (saws 68).

The scanners 34 shown in FIG. 13 are spaced sufficiently forward of the chippers for the log to be fully scanned and the scan data analyzed before the log enters the chipper 48. analyzing of the scan data from occlusion scanners 34 dictates the setting of the chippers. Accordingly the scanning function must be completed and the chippers pre set before a log can be passed through the chippers 48. This obviously requires a space between the scanning and chipping stations of at least the log length plus a minimum travel time to allow for the analysis.

The chipping heads 48 and the mechanism controlling and setting the chipping heads are not new. What is considered new is the provision of the camera scanning components 47, 51 and the utilization of the scan data, coupled with that of the scanners 34 for analysis of wane area configuration. This analysis has been described in preceding sections and will not be here repeated. A detailed description of the components is unnecessary and is accordingly deleted other than by illustration.

The side directed rollers 108 in conjunction with the sharp chain 36 and preceding the edging/profiling operation, controls and guides the log as it is directed into the profiling heads 60, 62. The setting again of these rollers 108 is controlled by the computer in response to the analysis of the scan data. The camera scanning components 47, 51 are mounted on the chipping heads support mechanism and moves with the chipping heads to maintain the surface being scanned within the focal field of the camera.

As previously explained, the scanner mechanism 47, 51 determines the setting of the profiling heads (following computer analysis) and the movement required by the heads 60, 62, up or down depending on the orientation of the calculated side board within the log. This controlled movement of the heads produces the desired board edges at their inclined orientation, a matter of coordinating the vertical movement of the heads with the horizontal movement of the sharp chain and thus the log movement. The movement of these heads is provided by the hydraulic cylinders 115, 119 shown most clearly in FIG. 15.

The control over the log during the edging operation is jeopardized by the various operations and particularly by vertical movement of the profiling heads 60, 62. Additional control over the log is provided by guide anvils 66. FIG. 15 best illustrates these guide anvils. The guide anvils are matched to the profiling heads 60, 62 so that as the edge of the board is formed, the guide anvils nest in the L shape of the cut to resist any vertical or lateral movement of the log. Note that the guide anvils are mounted on positioners 124 (hydraulic cylinders) that pivot the anvil within a guide rail 113. This combination properly orients the anvils to the angle of incline or decline of the board edge. The positioners 124 are pivoted to the proper position in response to computer instructions following scanning. Thus, whatever angle is established and incorporated by the cooperating profiling head movement, that angle is provided to the guide anvils by appropriate retraction or extension of the positioners 124 for guided movement of the anvils along the guide rail 113.

The band saws 68 are, of course, set by the computer, the mechanism for setting the saws being known to the art.

PREFERRED CANT PROCESSING APPARATUS IN DETAIL

The apparatus for the cant processing system is illustrated in FIGS. 18-21. A major difference between the two systems is the log conveying means. An advantage of the cant system is the provision of flat parallel sides on the top and bottom of the log. The clamping and driving rollers 74, 84 are precisely set to insure a desired orientation of the cant as it is conveyed through the system. Generally the clamping roller 74 is on top and the driving roller 84 is on the bottom but the initial bottom drive rollers are provided in conjunctin with a conveyor chain 126. The cant is pressed against the chain over its support rollers, and subsequently against rollers 84, by the pressure rollers 74 which are forced by pressure cylinders 116. The pressure needs to be sufficient to prevent the cant from skewing during the chipping operation.

As the cant leaves the chipping heads 99, it is picked up by intermediate clamping and driving roller 74, 84. This intermediate station of the clamping and drive rollers is important to maintain the stability of the cant as it passes from one operation to the other through the system.

Figure 21:
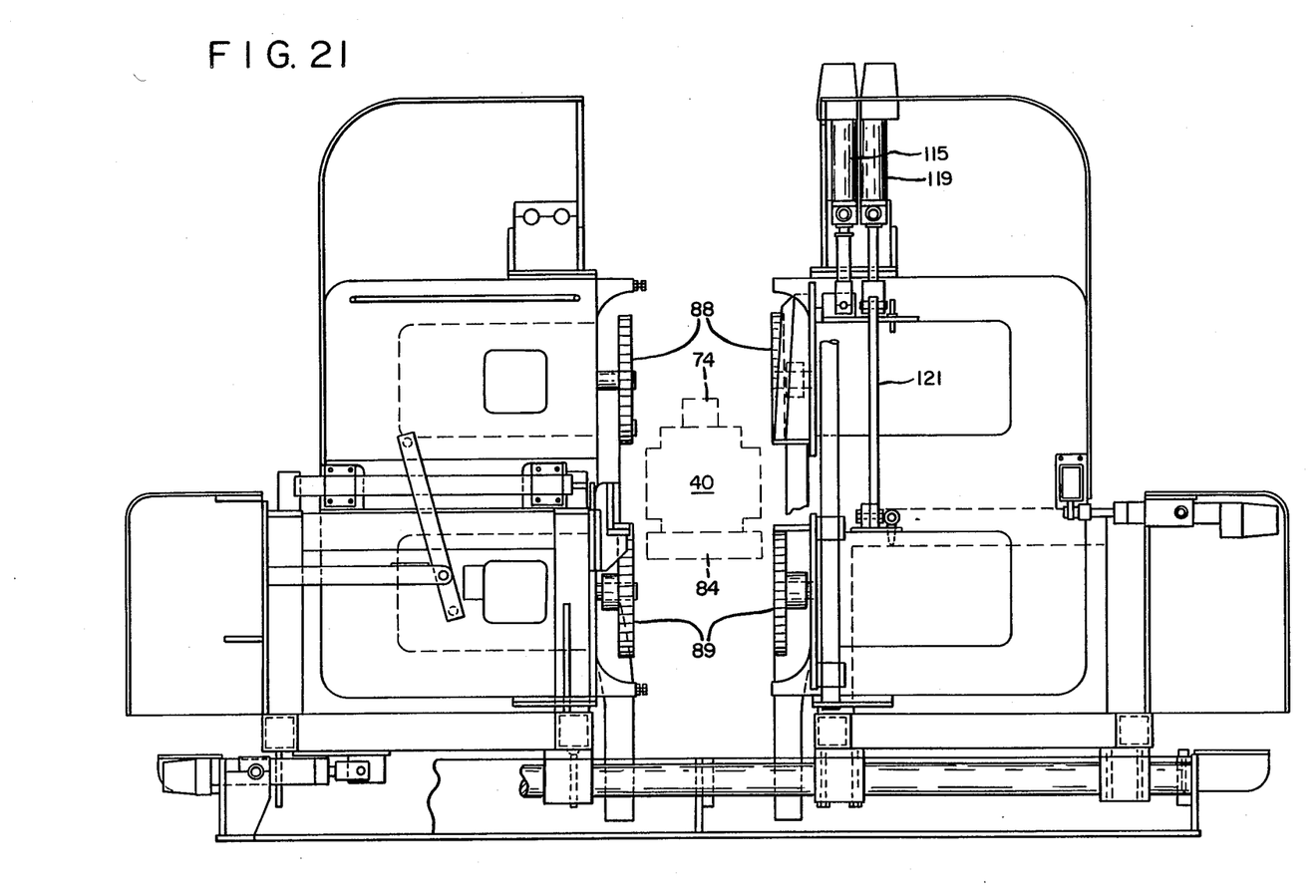
FIG. 21 is view taken on view lines 21—21 of FIG. 19.

The setting and control over the profiling heads 88, 89 are essentially the same as described for the log processing system except that because the top to bottom thickness of a cant will be predictably within a limited size range, both top and bottom profiling heads may be controlled by cylinders 115, 119 from the top of the apparatus (see FIG. 21). The control by cylinder 119 of the bottom profiling heads 89 is accomplished by linkage 121.

Figure 20:
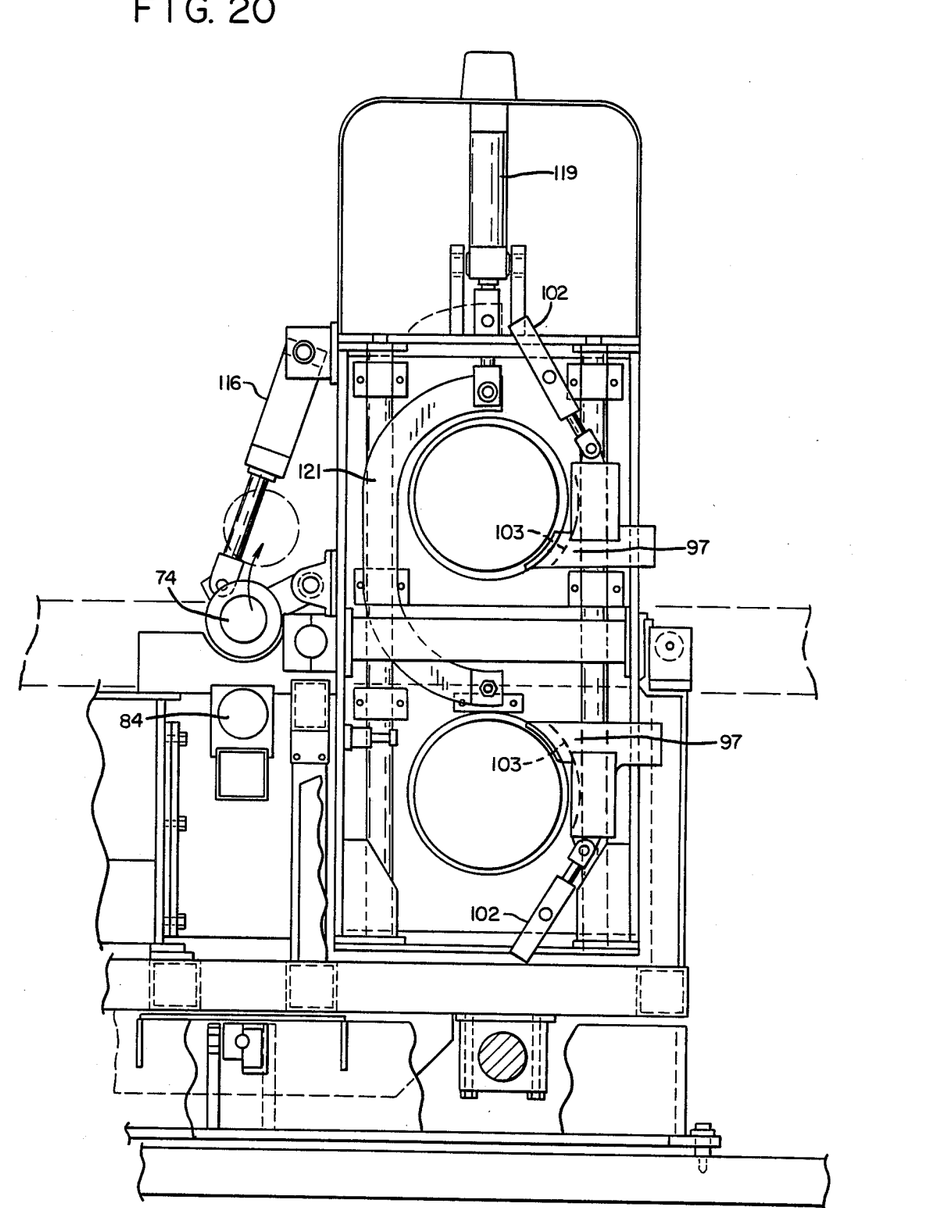
FIG. 20 is view taken on view lines 20—20 of FIG. 19.

As described for the profiling heads in the preceding "Preferred Log Processing Apparatus in Detail" section, control over the cant is enhanced by guide anvils 97. FIG. 20 best illustrates the anvils 97 for the cant processing apparatus. The guide anvils are matched to the profiling heads 88, 89 so that as the edge of the board is formed, the guide anvils nest in the L shape fo the cut to resist any vertical or lateral movement of the cant. Hydraulic positioners 102 position the anvils 97 as dictated by guide rails 103.

STATEMENT OF THE INVENTION

In essence, the control mechanism has been previously available for establishing precise setting of the profiling heads. What is deemed novel is the provision of scanning techniques for generating computer-based instructions that enables customized setting of the heads for different sized logs and cants processed through the system at random. Also believed novel is the concept of moving the heads during conveyance of the log or cant to enable the production of boards angularly oriented relative to the log travel. Still further, are the novel guide anvils (66, 97) that slide in the groove formed by the profiling heads to assist in the stbilization of the log or cant through the edging/profiling and sawing operations.

Much of the details of the mechanism has been omitted to avoid unnecessary complexity. The deleted mechanism is known to the art and specific description is unnecessary. As indicated in the introduction, the objective of the system is to enable optimization of log utilization by taking advantage of the benefits of coupling the operations of chipping, edging and cutting. In order to accomplish this objective, it is believed necessary to customize the grouping of operations to each successive log or cant fed into the system as differentiated from the pre-sorting concept of prior systems.

Customizing the operations to random size logs, produces conveying problems and profiling head setting problems. The utilization of side clamping rollers in conjunction with the sharp chain is one contribution and the provision of guide anvils following the profiling heads is another contribution for achieving log stability during conveyance of a log through the log processing system. In addition to the guide anvils, the top and bottom clamping rollers preceding, intermediate of, and following the system's operations is believed a solution to the conveying problem of the cant.

It is also believed novel to provide both occlusion and camera scanning capabilities with the scan data coupled and analyzed in a manner that establishes a rapidly obtained approximation of the total log segment configuration including the wane area at the edges of the proposed side boards. Furthermore, utilizing the information for setting the profiling heads and the angular setting of the guide anvils is considered novel.

Those skilled in the art will be able to practice the invention as described from the disclosure. Moreover, these inventions will be adaptable by those skilled in the art to other related processing apparatus. One example of a potential variation is the substitution of circular saw blades for the band saws in the log processing apparatus and vice versa in the cant processing apparatus. Another is a variatin to the location and organization of the scanning apparatus an example of which is discussed in the last paragraph under "Log Processing". Thus this invention is not limited to the specific embodiment disclosed.

We claim:

1. A computer controlled processing system for lumber production comprising;
  a computer,
  a sequence of processing stations for processing a log segment including; an excess material removing station for generating opposed flat side surfaces on the log segment, said flat side surfaces determined by the computer to become sides of boards to be severed from said log segments; a profiling station for forming profiled edges above and below said flat side surfaces to become the side edges of the boards to be severed from the log segment, and a severing station for severing the boards from the log segments,
  a conveyance means establishing a path of conveyance and having continuous control of the log segment in conveying the log segment along the path and through the above defined sequence of processing stations, and the improvement that comprises;
  scanning means prior to the profiling station for obtaining data of the configuration of the log segment in three dimensions, and said computer receiving said data and projecting the optimum side boards obtainable from the log segment including location and angular orientation of the side boards relative to the log segments conveyed along the path of conveyance; and
  said profiling station including adjustable profiling heads and said computer controlling the adjustable profiling heads, said profiling heads being continuously responsive to said computer to form the edges of the projected side boards during conveyance of the log segment through the profiling station.

2. A computer controlled processing system as defined in claim 1 wherein said scanning means includes an occlusion scanner and a reflective beam scanner positioned for cooperative scanning so as to obtain longitudinal planer profiles of said log segment in the vertical and horizontal planes and to obtain incremental wane area configurations in cross section of areas perceived to be the location of the side board edges.

3. A computer controlled processing system as defined in claim 2 wherein the log segment is a center cant having opposed top and bottom flat surfaces and the wane area configuration at the cross sectional intervals is computed from scanned tangent line positions perpendicular to the flat surfaces, the proportional distances of the upper and lowe surface edges to the common tangent line positions determining assumed points of tangency, said assumed points of tangency and the surface edge positions determining the segments of circles assumed to approximate the wane area configurations.

4. A processing system as defined in claim 2 wherein a chipping operation generates said opposed flat side surfaces on the log segment and comprises movable chipping heads, and the reflective beam scanner comprises a transmitting beam source and a reflective beam receiver for each of the opposed flat surfaces, said receivers mounted for movement with the chipping heads for maintaining a constant field of focus relative to the flat surfaces of the log segment.

5. A processing system as defined in claim 1 wherein adjustable guide anvils are positioned immediately following the profiling heads for engaging the formed edges and thereby stabilizing the log segment, said guide anvils being responsive to the computer and said computer controlling the adjustment of the guide anvils for pre-adjustment to the orientation of the side board edge to be formed by the profiling heads.

6. A processing system as defined in claim 1 wherein the log segment is an unprocessed log, and said conveyance means is comprised of a sharp chain on which the log is impaled for conveyance by the sharp chain through the sequence of stations, and said computer controlling said chipping operation for forming the flat side surfaces as determined by the scanning means and computer, and side rollers positioned along the path of conveyance preceding the profiling heads to engage the flat surfaces for stabilization.

7. A processing system as defined in claim 1 wherein the log segment entering the sequence of stations is a center cant having top and bottom parallel flat surfaces, said conveyance means including pairs of clamping and driving rollers engaging the top and bottom flat surfaces of the cant, at least one pair of said clamping and driving rollers positioned between the chipping and profiling stations.

8. A system for processing logs into lumber comprising; a computer, a series of operating stations including a dual axis occlusion scanner station, a chipping station, a reflective beam scanner station, a profiling station, and a sawing station, and a sharp chain conveyer for conveying a sequence of randomly sized logs through the series of operating stations, said dual axis occlusion scanner station providing a model of each log's configuration for the computer, said computer computing an optimum configuration of lumber pieces to be produced from the log, said computer controlling said chipping station and said chipping station in response to computer instruction removing excess material to generate opposed flat parallel side surfaces representing the outer faces of side boards determined from the configuration, said reflective beam scanner station determining the wane area configuration at the side board side edges, said computer determining the desired edges of the side boards having acceptable wane area included therein, said computer controlling said profiling station and said profiling station controlled in response to computer instructions for vertical movement matched to the log conveyance for edging the determined side boards at an incline, and said computer controlling said sawing station and said sawing station sawing the pre-edged boards from said log in response to computer instruction.

9. A system as defined in claim 8 wherein stabilizing rollers engage the flat sides of the log preceding the profiling station.

10. A system as defined in claim 9 wherein stabilizing anvils engage the edges of the determined side boards following the profiling station.

11. A system for processing cants into lumber comprising; a computer, a series of operating stations including a combined occlusion and reflective beam scanning station, a chipping station, a profiling station and a sawing station, and conveying means for conveying randomly sized cants through the series of operating stations oriented with opposed flat parallel surfaces positioned as the top and bottom surfaces of the cant with rounded sides of wane area, said scanning station providing a model of each cant's configuration including vertical tangent lines and points of intersection between the flat surfaces and bordering wane area at selected cross sections, said computer computing the location of side boards in the cant and the side board side edges as determined from the scanning station, and said computer controlling the operating stations and each of said series of operating stations responsive to the computer to remove excess material in the chipping station, edge the side boards at an incline as required in the profiling station and saw the boards in the sawing station, all as a coupled sequence of operations.

12. A system as defined in claim 11 wherein the cant is aligned on the conveying means after scanning in the scanning station for travel through the sequence of succeeding operations, said conveying means including pairs of clamping and driving rollers engaging the top and bottom surfaces of each cant for conveyance of the cant in the aligned position through the system, at least one pair of said rollers positioned between the chipping and profiling stations.

13. A system as defined in claim 12 wherein guide anvils are positioned against the edges formed at the profiling station to stabilize the movement of the log through the profiling and sawing stations, said guide anvils including adjustment means and said computer controlling the adjustment means, said adjustment means responsive to computer instruction for adjustment to the incline of the edges generated in the profiling station.

* * * * *